United States Patent [19]
Wu et al.

[11] Patent Number: 5,978,843
[45] Date of Patent: Nov. 2, 1999

[54] SCALABLE ARCHITECTURE FOR MEDIA-ON-DEMAND SERVERS

[75] Inventors: Chiung-Shien Wu, Kaohsiung; Gin-Kou Ma, Hsinchu; Muh-Rong Yang, Taipei, all of Taiwan

[73] Assignee: Industrial Technology Research Institute, Hsinchu, Taiwan

[21] Appl. No.: 08/736,216

[22] Filed: Oct. 23, 1996

Related U.S. Application Data

[63] Continuation-in-part of application No. 08/568,413, Dec. 6, 1995, Pat. No. 5,771,234.
[51] Int. Cl.$^6$ ..................................................... G06F 15/16
[52] U.S. Cl. ............................... 709/219; 709/250; 712/2
[58] Field of Search ................................ 370/537, 540, 370/541; 395/800.2, 200.49, 200.8; 712/2; 709/219, 250

[56] References Cited

U.S. PATENT DOCUMENTS

| | | | |
|---|---|---|---|
| 5,124,978 | 6/1992 | Chao | 370/60 |
| 5,274,631 | 12/1993 | Bhardwaj | 370/60 |
| 5,448,567 | 9/1995 | Dighe | 370/94.2 |
| 5,537,408 | 7/1996 | Branstad | 370/79 |
| 5,682,509 | 10/1997 | Kabenjian | 395/309 |

*Primary Examiner*—Glenton B. Burgess
*Assistant Examiner*—William Titcomb
*Attorney, Agent, or Firm*—Proskauer Rose LLP

[57] ABSTRACT

A scalable server architecture for use in implementing scaled media servers capable of simultaneous real-time data stream retrieval for large numbers of subscribers. A scalable server includes a plurality of stream pumping engines each accessing a particular storage device of a storage subsystem, and a server processor which receives retrieval requests from subscribers and directs the stream pumping engines to retrieve the requested data streams. Each of the stream pumping engines may include a storage controller coupled to its corresponding storage device for directing retrieval of the requested stream therefrom, a network controller for supplying the retrieved stream to a client network, and a processor for directing the operation of the storage and network controllers. Each of the stream pumping engines may also include a shared memory accessible by the corresponding stream pumping engine processor and the server processor. The shared memory facilitates communication with other stream pumping engines via the server processor and server system bus. A scaled media server may be implemented by cross-connecting several scalable servers with a plurality of stream multiplexers. Each of the stream multiplexers can include a separate packet input unit for processing the packets of each media stream such that two distinct levels of transmission priority are provided and quality of server restrictions are satisfied for all streams.

8 Claims, 7 Drawing Sheets

SCALABLE ARCHITECTURE FOR MEDIA-ON-DEMAND SERVERS

RELATED APPLICATIONS

The subject matter of the present application is related to the subject matter of U.S. patent application Ser. No. 08/736,215 of Gin-Kou Ma, Chiung-Shien Wu and Muh-Rong Yang filed Oct. 23, 1996, pending and entitled "Media Server for Storage and Retrieval of Voluminous Multimedia Data," and U.S. patent application Ser. No. 08/657,739 of Shiao-Li Tsao, Yueh-Min Huang, Eric Lee and Yih-Woei Liang filed May 31, 1996 and entitled "Improved Method of Data Placement of Continuous Media to Utilize Bandwidth Efficiency," both of which are assigned to the present assignee and incorporated by reference herein. In addition, this application is a continuation-in-part of U.S. patent application Ser. No. 08/568,413 to Chiung-Shien Wu et al, and filed on Dec. 6, 1995, now U.S. Pat. No. 5,771,234.

FIELD OF THE INVENTION

The present invention relates to media-on-demand systems in which stored multimedia comprising multiple digital bit streams are retrieved and delivered by a media server on a real-time and on-demand basis. More particularly, the invention relates to a scalable architecture for a media server which may be used to implement multimedia data delivery systems servicing large numbers of simultaneous subscribers.

BACKGROUND OF THE INVENTION

Multimedia server design is emerging as a key technology in the trend toward interactive multimedia services such as video-on-demand (VOD), teleshopping, digital video broadcasting and distance learning. A media server primarily acts as an engine, reading multimedia data streams from disk storage devices and delivering the streams to clients at a proper delivery rate. The multimedia bit streams are digital bit streams representing video, audio and other types of data. Each multimedia bit stream is generally delivered subject to a quality-of-service (QOS) constraint, such as average bit rate or maximum delay jitter. One of the most important performance criteria of an interactive multimedia system is the maximum number of real-time multimedia data streams that can be simultaneously supported. A media server generally must be able to deliver retrieved multimedia streams in a timely manner while simultaneously supporting real-time retrieval requests of a large number of clients. A number of different bottlenecks limit the stream retrieval and delivery capability of a media server. These bottlenecks include, for example, storage device input/output (I/O) limitations, network bandwidth restrictions, and central processing unit (CPU) processing overhead.

FIG. 1 shows an exemplary prior art video server 10 suitable for use in a multimedia data delivery system. The server 10 includes a microprocessor 12 coupled to a memory 14. A storage controller 16 directs the storage and retrieval of multimedia data streams in a disk storage device 18 which may be a multiple-disk array. The server 10 also includes a network controller which 20 serves as an interface to an access network shared by a plurality of subscribers. The microprocessor 12, storage controller 16 and network controller 20 are interconnected by a system bus 22. The network controller 20 receives requests for retrieval of stored video streams from subscribers via the access network and passes the requests via system bus 22 to the microprocessor 12. The microprocessor 12 utilizes a disk scheduling algorithm to generate retrieval instructions which are supplied to the storage controller 16 to direct the retrieval of the requested data streams from the storage device 18. The server 10 is configured to provide simultaneous retrieval of multiple stored streams in response to corresponding requests from the subscribers. The operation of video server 10 is described in greater detail in, for example, F. A. Tobagi and J. Pang, "StarWorks—A Video Application Server," IEEE COMPCON, Spring '93, pp. 4–11, and W. Tseng and J. Huang, "A High Performance Video Server For Karaoke Systems," IEEE Transactions on Consumer Electronics, Vol. 40, No. 3, August 1994, pp. 329–336. The server computer 10 of FIG. 1 suffers from a significant problem in that it generally unable to simultaneously support retrieval requests for real-time video from a large number of clients. The server 10 is instead better suited for use in local area network (LAN) applications in which a personal computer (PC) or workstation is configured to serve a relatively small number of clients.

FIG. 2 illustrates a prior art architecture for scaling a video server 10 such as that shown in FIG. 1 in order to increase the number of simultaneous data stream retrievals and thereby the number of subscribers which can be supported. The scaled server network of FIG. 2 includes m of the video servers 10-$i$ connected to a switch network 24. The switch network 24 is connected to n of the subscribers 26-$i$. The switch network delivers the outputs of the video servers 10-$i$ to the subscribers 26-$i$ in accordance with subscriber requests and thereby provides some increase in the number of subscribers which can be supported simultaneously. However, these and other switch-based scalable servers are generally unable to provide a multimedia distribution system accessible by a sufficiently large number of subscribers.

Other prior art systems provide video-on-demand service architectures combined with network capability. Examples of such systems may be found in U.S. Pat. No. 5,442,749 issued Aug. 15, 1995 to J. D. Northcutt et al., assigned to Sun Microsystems Inc. and entitled "Network Video Server System Receiving Requests From Clients for Specific Formatted Data Through a Default Channel and Establishing Communication Through Separate Control and Data Channels," U.S. Pat. No. 5,508,732 issued Apr. 16, 1996 to J. F. Bottomley et al., assigned to IBM Corp. and entitled "Data Server, Control Server and Gateway Architecture System and Method for Broadcasting Digital Video on Demand," U.S. Pat. No. 5,521,631 issued May 28, 1996 to H. S. Budow et al., assigned to SpectraVision Inc. and entitled "Interactive Digital Video Services System With Store and Forward Capabilities," U.S. Pat. No. 5,471,318 issued November 28, 1995 to S. R. Ahuja et al., assigned to AT&T Corp. and entitled "Multimedia Communications Network," and Republic of China Patent No. 252248 851101 29-0 72228, July 1995. These other systems fail to address and solve the scalability issue and thus cannot support a sufficient number of subscribers.

As is apparent from the above, a need exists for a scalable media server architecture which may be used to implement multimedia data delivery systems supporting large numbers of subscribers and simultaneous real-time data stream retrievals.

SUMMARY OF THE INVENTION

The present invention provides a scalable media server which can be used to implement a scaled server for simultaneous retrieval and delivery of a large number of media data streams. Various aspects of the invention relate to the design of a stream pumping engine used as a basic building block in a scalable media server, the manner in which multiple scalable servers may be interconnected to provide a scaled server with a desired data delivery capability, and a stream multiplexer for delivering the multiple media data streams from a scaled server in accordance with agreed-upon quality of service restrictions.

In accordance with one aspect of the invention, a scalable media server is provided which includes a plurality of stream pumping engines. Each of the stream pumping engines is connected between a distinct storage device of a storage system and a system bus of the scalable media server. A given stream pumping engine retrieves a requested data stream stored on the distinct storage device to which it is connected, and delivers the requested data stream to an appropriate subscriber. The scalable server also includes a server processor coupled to the stream pumping engines via the system bus. The server processor receives retrieval requests from clients and directs the operations of the plurality of stream pumping engines in accordance with the retrieval requests. A given stream pumping engine may include a storage controller coupled to the corresponding storage device, and a network controller coupled to the storage controller. The storage controller retrieves a data stream from the corresponding storage device in response to particular retrieval requests, while the network controller delivers the retrieved data stream to a network accessible by the appropriate client. The given stream pumping engine also includes a stream pumping engine processor which is coupled to the storage controller and network controller and directs the operations of those elements. The given stream pumping engine may also include a shared memory accessible by the server processor via a host system bus and accessible by the stream pumping engine processor via an internal data bus of the stream pumping engine. This facilitates communication between the various stream pumping engines of the scalable server such that all subscribers can be provided access to all storage devices in the storage system.

Another aspect of the invention involves interconnecting several scalable media servers to provide a scaled media server suitable for servicing large numbers of subscribers. The interconnection mechanism utilizes a set of stream multiplexers cross-connected with a number of the media server hosts. Each of the media server hosts includes a plurality of stream pumping engines configured in the manner described above. The stream multiplexers have inputs cross-connected to at least one retrieved data stream output of each of the scalable media host servers, and deliver the retrieved data streams in accordance with quality of service restrictions. Each of the stream multiplexers may include a plurality of packet distribution circuits and a plurality of packet input units. The packet distribution circuits distribute packets corresponding to a given retrieved data streams to a particular packet input unit, such that each packet input unit receives the packets of only one of the retrieved streams.

The packet input units process the packets in accordance with the quality of service requirements of the particular stream, and deliver the packets to a corresponding output buffer.

Another aspect of the invention relates to the packet input units of the stream multiplexers. The packet input units determine whether a given packet applied thereto is in a peak rate state, a mean rate state or a non-conformance state, and routes a given packet in the mean rate state to a mean rate output, routes a given packet in the peak rate state to a peak rate output, and allows a packet in the non-conformance state to be delayed or discarded. The packet input units may utilize a two-stage leaky bucket mechanism to determine the state of the given packet. A server accessing at most J video sources may include stream multiplexers each having a total of J packet input units. The packet input units of a given stream multiplexer may be serially interconnected with J delay circuits such that each of the J packet input units operates serially. The given stream multiplexer may maintain first and second buffers for holding peak rate state and mean rate state packets, respectively, such that two distinct priority levels are provided for transmission of packets to subscribers.

DETAILED DESCRIPTION OF THE INVENTION

The present invention will be illustrated below in an exemplary media server application which delivers multimedia data streams to subscribers via a network. It should be understood, however, that the described techniques are more generally applicable to any other data storage and retrieval application in which multiple data streams are simultaneously retrieved from a media storage device by a server and delivered to one or more clients. The term "server" as used herein should be understood to include a computer, application-specific integrated circuit (ASIC), microprocessor or any other digital data processor capable of carrying out the described data storage and retrieval processes. The term "client" should be understood to include a subscriber to a multimedia distribution system, or any other user or terminal of a computer network, cable network, telephone network or other type of data distribution network.

Figure 1:
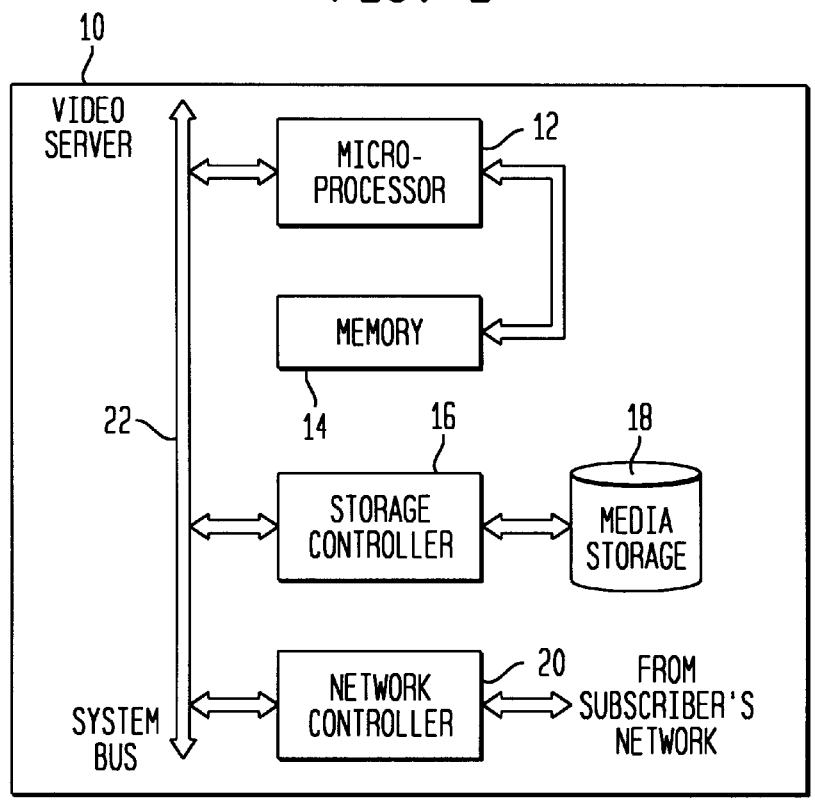
FIG. 1 shows a video server computer in accordance with the prior art.
Figure 2:
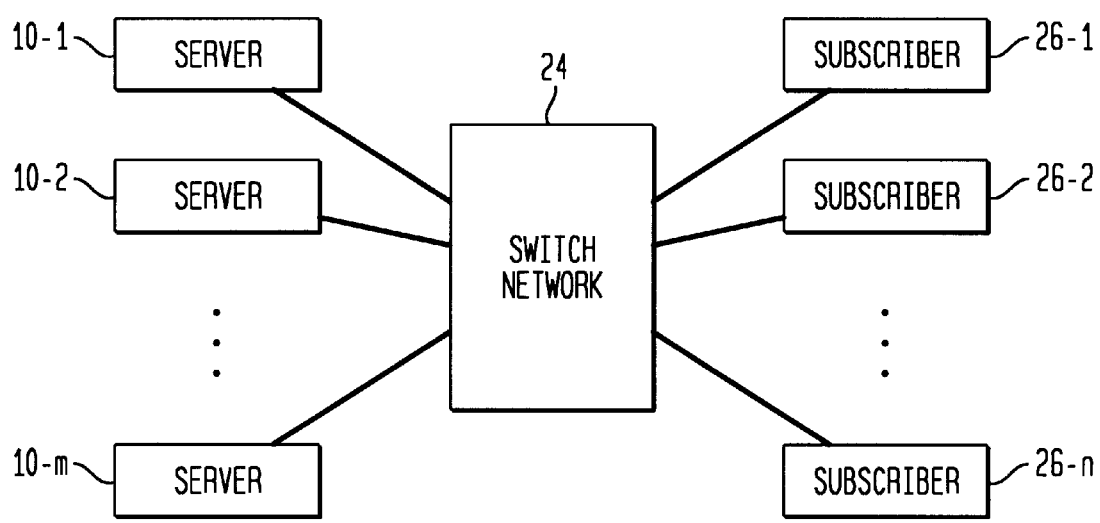
FIG. 2 illustrates a prior art data delivery system based on the video server computer of FIG. 1.
Figure 3:
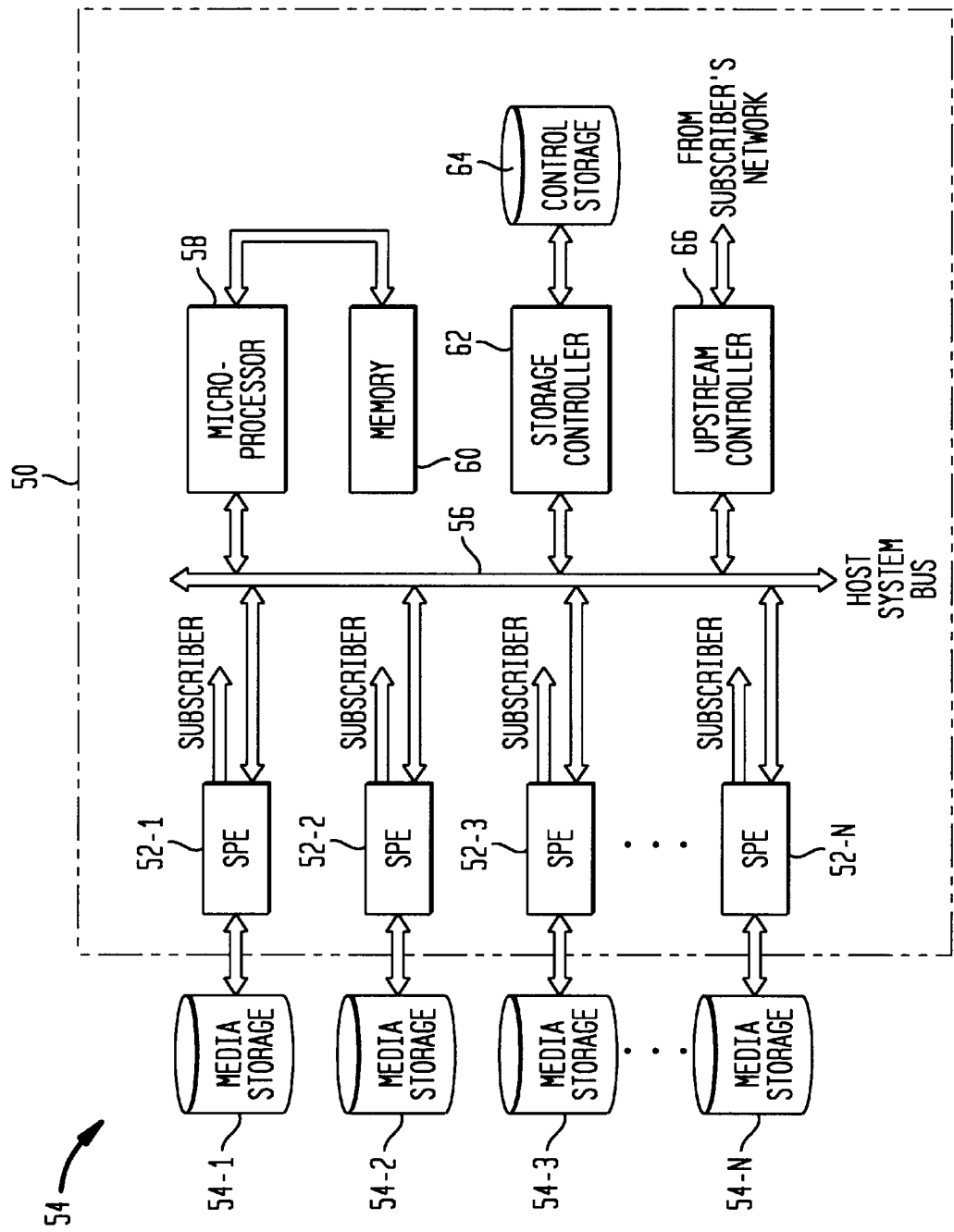
FIG. 3 is a block diagram of scalable media server host in accordance with an exemplary embodiment of the present invention.

FIG. 3 shows an exemplary scalable media server host 50 in accordance with an exemplary embodiment of the present invention. The scalable media server host 50 includes N stream pumping engines (SPEs) 52-$i$, $i$=1, 2, ... N which are used to retrieve data streams from and store data streams to a media storage subsystem 54 which includes N disk-based storage devices 54-$i$. The data streams may be stored in the disk-based storage devices 54-$i$ in the manner described in the above-cited U.S. patent application Ser. No. 08/657,739, Now U.S. Pat. No. 5,742,443, issued Apr. 21, 1998, of Shiao-Li Tsao et al. entitled "Improved Method of Data Placement of Continuous Media to Utilize Bandwidth Efficiency," which is incorporated by reference herein. Each of the SPEs 52-$i$ delivers a data stream retrieved from a storage device 54-$i$ to a subscriber of a multimedia data delivery system in which scalable media server host 50 is installed. The SPEs 52-$i$ and the corresponding interfaces with the subscribers are interconnected via a host system bus 56. The media server host 50 also includes a microprocessor 58 coupled to a memory 60, a storage controller 62 coupled to a control storage device 64, and an upstream controller 66 connected to receive upstream retrieval requests from the subscribers of the data delivery system. The microprocessor 58, storage controller 62 and upstream controller 66 are coupled to the host system bus 56. The upstream controller 66 is controlled by the microprocessor 58 to receive and process the upstream retrieval requests from the subscribers. The control storage 64 stores control software which is used by the microprocessor 58 to direct retrieval operations to be described in greater detail below.

Figure 4:
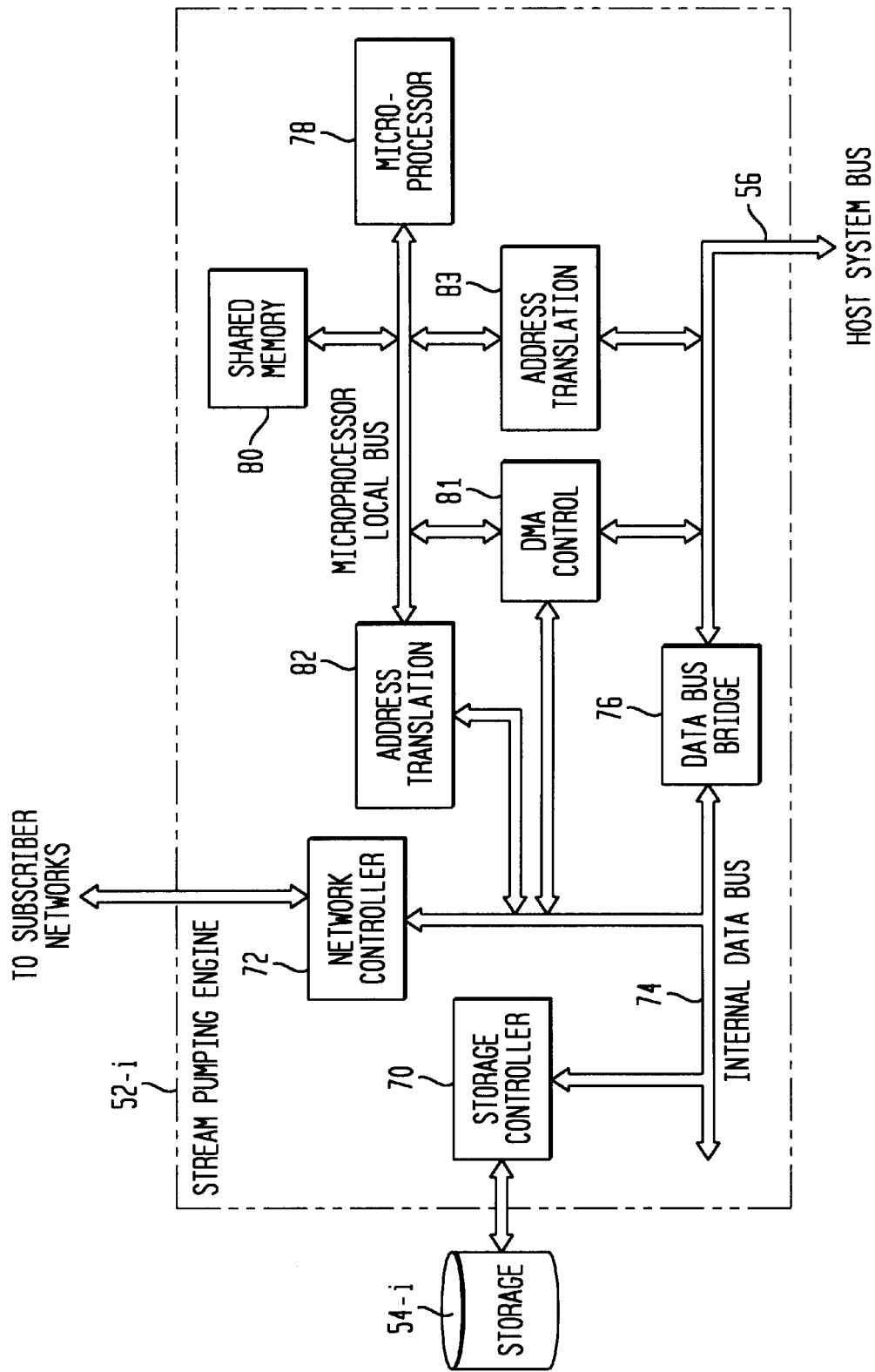
FIG. 4 is a block diagram of an exemplary stream pumping engine (SPE) suitable for use in the scalable media server host of FIG. 3.

FIG. 4 is a block diagram of an exemplary SPE 52-$i$ in accordance with the present invention. The SPE 52-$i$ is coupled to the disk-based storage device 54-$i$ via a storage controller 70. An internal data bus 74 couples the storage controller 70 to a network controller 72 and a data bus bridge 76. The network controller 72 delivers retrieved data streams to the subscriber network as shown. The storage controller 70 and network controller 72 are controlled by a microprocessor 78. The data bus bridge 76 serves as an intermediate buffer for data transmitted between the internal data bus 74 and the host system bus 56 of the media server host 50. A shared memory 80 can be accessed either from the host system bus 56 or the internal data bus 74 via direct memory access (DMA) control unit 81 and address translation units 82, 83. The address translation units 82, 83 perform address mapping between the shared memory 80 and other devices accessing the shared memory 80 via the host system bus 56 or the internal data bus 74.

Retrieval instructions may be delivered from microprocessor 78 via internal data bus 74 to the storage controller 70. It may be necessary to buffer a given retrieved data stream in SPE 54-$i$ between retrieval and delivery. As noted above, the exemplary shared memory 80 of the SPE 52-$i$ is coupled to the host system bus 56 and the internal data bus 74 and may be accessed by microprocessor 58 of the media server host 50 as well as the SPE microprocessor 78. The shared memory 80 may therefore be used to buffer a retrieved stream as necessary. The SPE configuration in accordance with the present invention also allows one SPE 52-$i$ to communicate with another SPE 52-$i$ via the data bus bridge 76 which accesses the host system bus 56 of the media server host 50.

The SPE 52-$i$ of FIG. 4 serves as an integrated control board for retrieving a requested data stream from the storage device 54-$i$ and directing the retrieved stream to the appropriate subscriber via the subscriber networks. The SPE microprocessor 78 directs the other elements of SPE 52-$i$ to provide the following exemplary processing functions: (1) retrieve a block of a requested data stream from the media storage device 54-$i$ using the storage controller 70; (2) transport the retrieved data stream block via internal data bus 74 to the shared memory 80; (3) repeat Steps (1) and (2) continuously if the requested data stream is to be accessed continuously; (4) read the retrieved data stream block from the shared memory 80 and deliver it to the appropriate subscriber network via the network controller 72; and (5) repeat Step (4) if the retrieved media stream is to be delivered continuously.

The SPE 52-$i$ thus allows its corresponding media storage device 54-$i$ to be accessed directly through a subscriber network. Each SPE 52-$i$ can support delivery of multiple retrieved streams to multiple subscribers. The media server host 50 of FIG. 3 combines several SPEs to provide a larger media server which can simultaneously serve a larger number of subscribers via the SPEs 52-$i$. The media server host 50 accepts and processes upstream requests from the subscribers such that the media streams stored in the storage subsystem 54 can be accessed interactively on demand via the SPEs 52-$i$.

The microprocessor 58 of the media server host 50 directs the elements of the server host 50 and the corresponding SPEs 52-$i$ to provide the following processing functions: (1) control of SPE-to-SPE communications using a technique such as DMA; (2) admission control and processing of upstream data retrieval requests received from the subscribers via the upstream controller 66; and (3) other retrieval management functions. The communication between two SPEs may be necessary in the event that subscribers assigned to one SPE may request retrieval of data stream stored in the storage device controlled by another SPE. This communication can be achieved using well-known DMA techniques. The shared memory 80 of a given SPE 54-$i$ can be accessed directly by another SPE 54-$i$ via the host system bus 56 of the scalable media server host 50 in conjunction with DMA control unit 81 and address translation unit 83. The media server host 50 and SPE 52-$i$ structures of FIGS. 3 and 4 provide a clear division between service management and data retrieval/delivery functions which facilitates scalability. The SPE operations can therefore be optimized to provide a desired throughput capacity while maintaining guaranteed quality of services.

Figure 5:
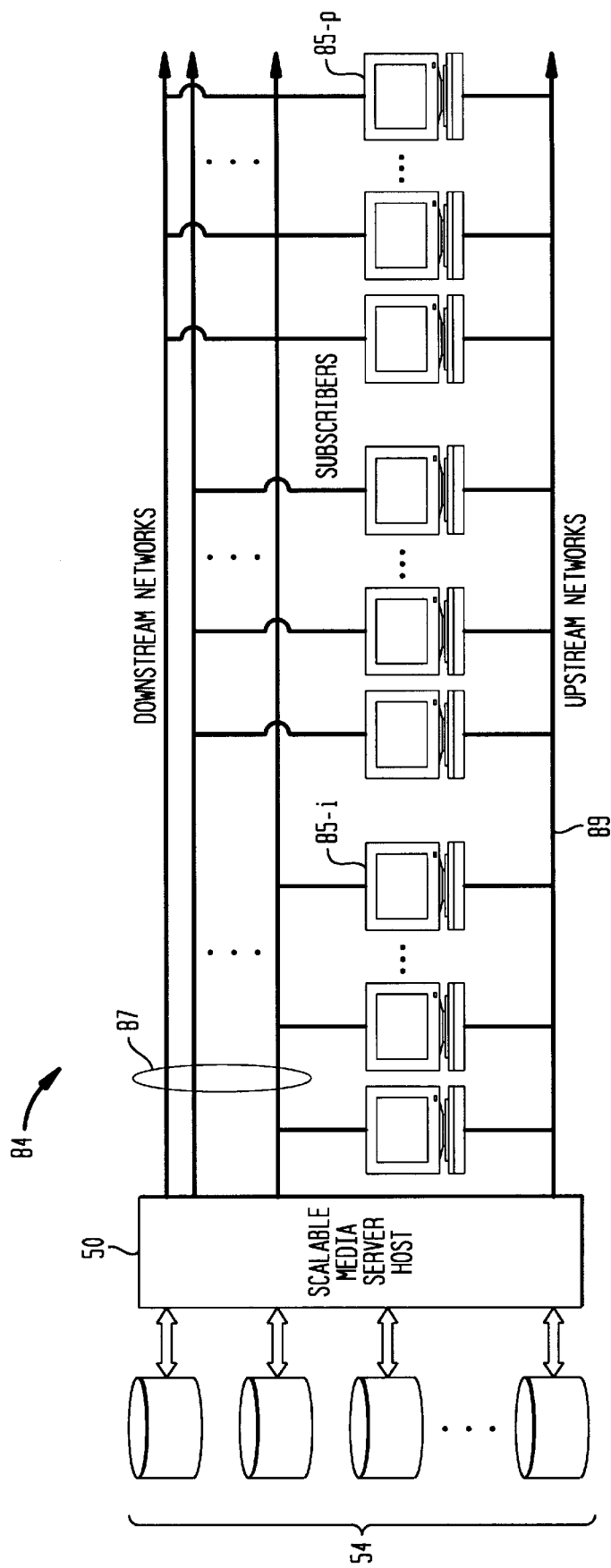
FIG. 5 is a block diagram illustrating the manner in which the scalable media server host of FIG. 3 may be used to interconnect multiple subscribers.

FIG. 5 illustrates a multimedia data delivery system 84 in which the scalable media host 50 of FIG. 3 is utilized to deliver retrieved streams to a large number P of subscribers. The scalable media server host 50 retrieves requested data streams from the storage subsystem 54 and delivers them to a plurality of subscribers 85-$i$, $i$=1, 2, . . . P using the SPEs 52-$i$ in the manner previously described. The retrieved streams are delivered to the subscribers 85-$i$ via connections 87 of the downstream networks and retrieval requests are sent from the subscribers 85-$i$ to the media server host 50 via a connection 89 of the upstream networks. The media server host 50 is readily scalable to service larger numbers of subscribers by adding additional SPEs 52-$i$ or by interconnecting server host 50 with other similar server hosts.

Figure 6:
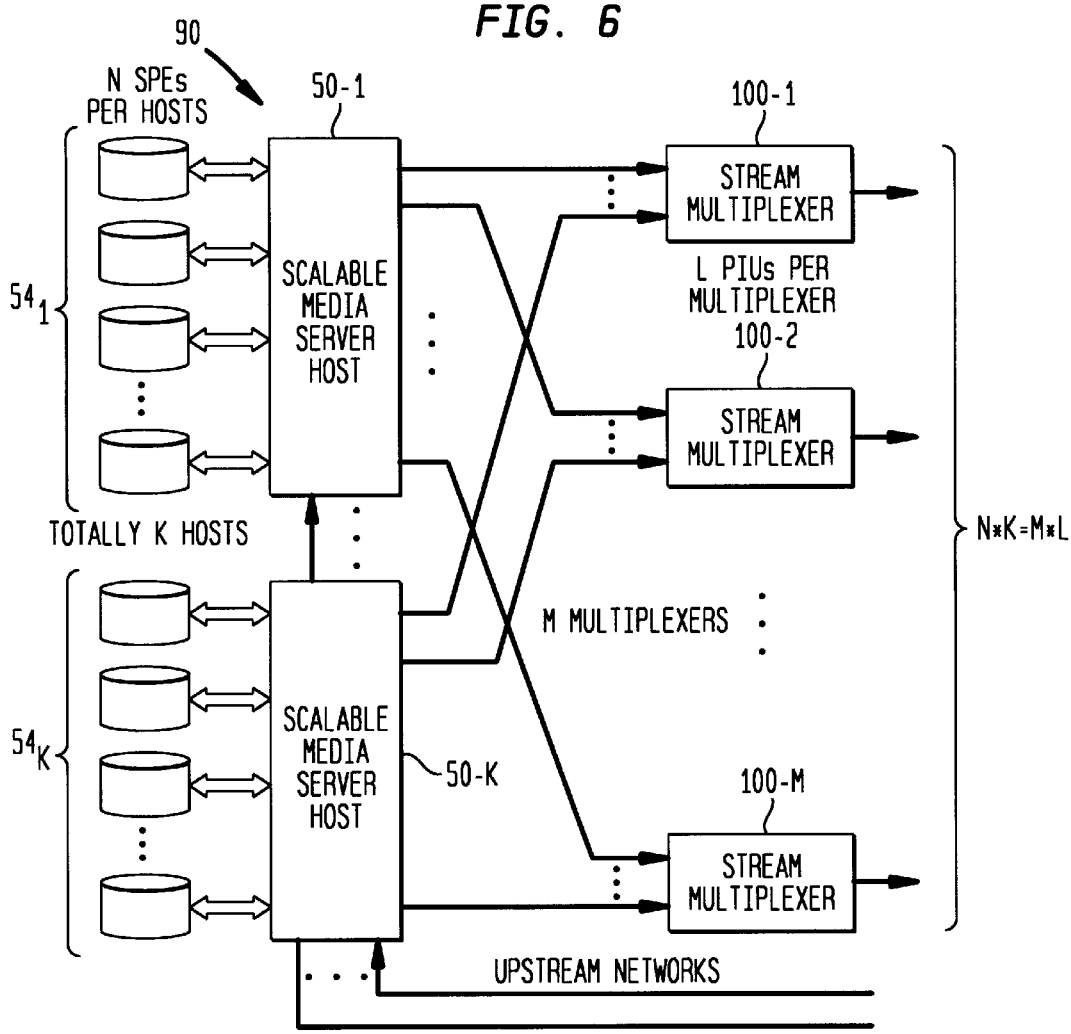
FIG. 6 shows an implementation of a residential-area scaled media server in accordance with an exemplary embodiment of the present invention.

FIG. 6 shows an exemplary scaled residential-area media server 90 in accordance with the present invention. The scaled server 90 is primarily designed for interactive media-on-demand services over a larger area than that serviced by the system 84 of FIG. 5. The scaled server 90 includes K scalable media server hosts cross-connected to a set of M stream multiplexers 100-$i$ such that each subscriber connected to one of the stream multiplexers 100-$i$ can access each of K storage subsystems 54, through 54$_K$ via the K media server hosts 50. The retrieved data in the scaled server 90 is carried by packets and the scaled server 90 operates in a manner analogous to a packet switch. Each retrieved stream is characterized by agreed-upon quality of service (QOS) parameters such as maximum transmission rate, maximum delay and the like. The transmission and switching of the media stream packets through the scaled server 90 is configured to preserve the original QOS parameters of a given retrieved stream. As will be described in greater detail below in conjunction with FIG. 9, the stream multiplexers 100-$i$ in the scaled server 90 are designed to avoid the introduction of an unexpected additional jitter, delay or other disturbance for a media stream being switched through the multiplexer.

The operation of the multiplexers 100-$i$ will be illustrates for two types of media streams, namely variable bit rate (VBR) and constant bit rate (CBR) streams. It will be assumed without limitation that a "cycle"represents a fixed time interval containing a fixed number of media packets. A VBR source can be modeled by the following two parameters: (1) $BP_i$=the peak rate of a media source i, which is defined as the maximum number of packets permitted in a cycle; and (2) $BM_i$=the mean rate of a media source i, which is defined as the average number of packets transmitted in a cycle. For CBR sources, $BP_i$=$BM_i$. The stream multiplexer 100-$i$ may be viewed as an M×N switch, where M may be greater than N in order to make the storage space scalable. As noted above, the stream multiplexer 100-$i$ should guarantee the throughput of each retrieved stream within a bounded delay variance. Conventional multiplexing techniques such as round robin or weighted round robin may not provide acceptable performance for VBR streams. The exemplary multiplexer 100-$i$ described below is based on a well-known "leaky bucket" mechanism.

Figure 7:
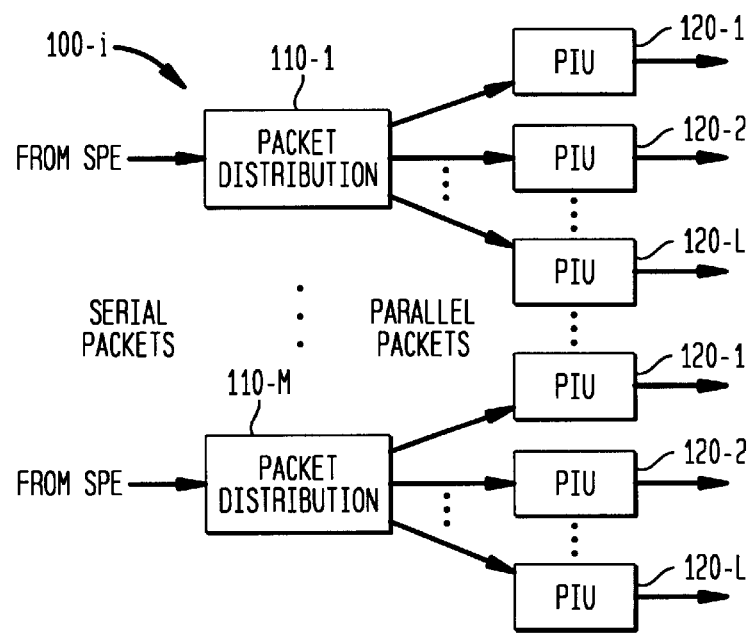
FIG. 7 illustrates a packet re-distribution mechanism suitable for use in the stream multiplexers of the media server of FIG. 6.

FIG. 7 shows the exemplary stream multiplexer 100-$i$ in greater detail. The multiplexer 100-$i$ receives serial data packets from the SPEs 52-$i$ of the scalable media server hosts 50-$i$ of scaled server 90. The serial data packets are applied to a plurality of packet distribution circuits 110-$i$ which distribute the packets to packet input units (PIUs) 120-$i$. Each PIU 110-$i$ accepts one media stream on a packet-by-packet basis, processes the packets in accordance with the QOS requirement of the stream, and delivers the packets to a corresponding output buffer for multiplexing. The packet distribution circuits 110-$i$ checks each packet received from the SPEs 52-$i$ and then re-distributes the packet to the correct PIU 120-$i$. The packet distribution circuits 110-$i$ determine which stream each packet belongs to, so that each PIU 120-$i$ can process one media stream independently.

Figure 8:
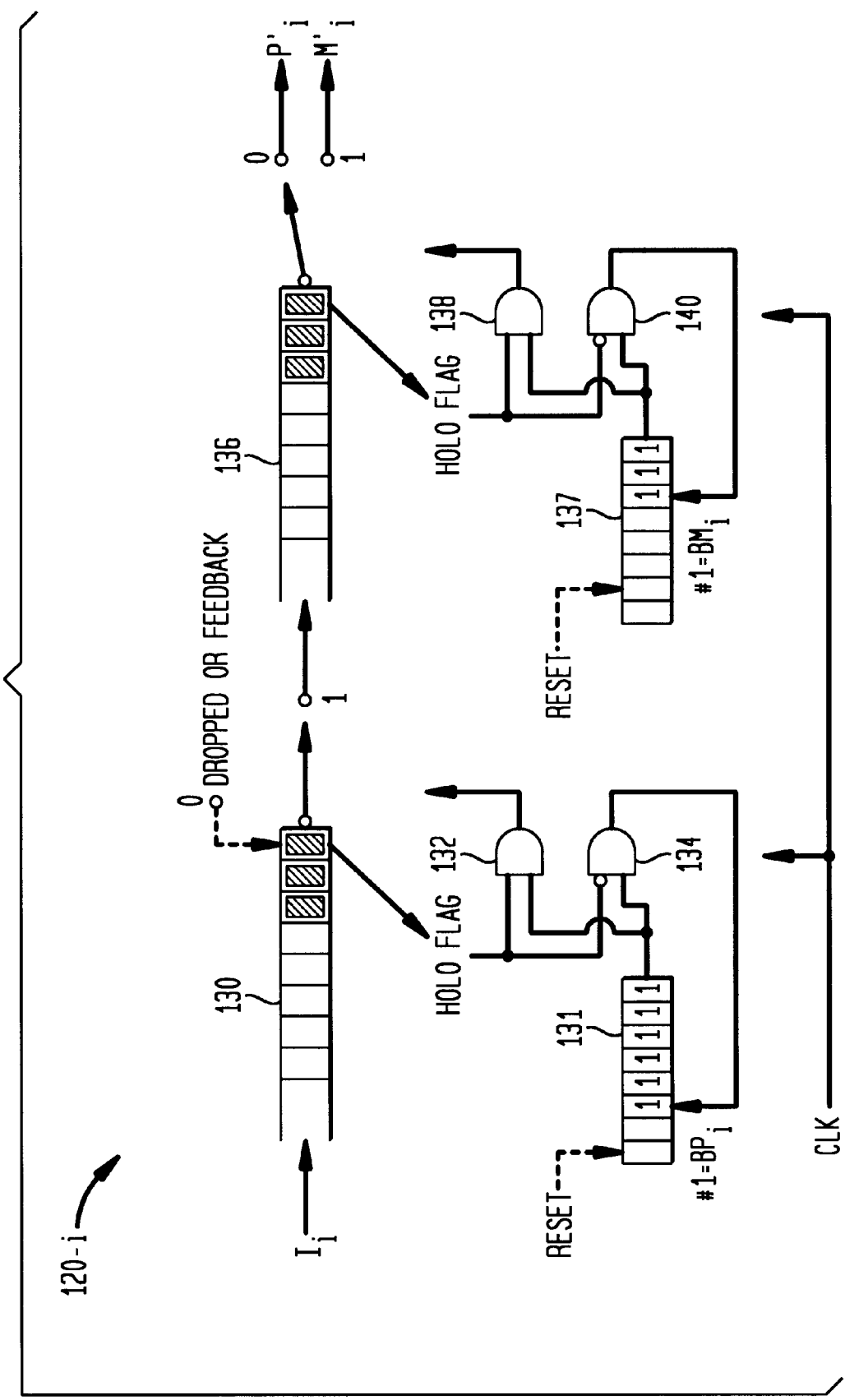
FIG. 8 illustrates the operation of a packet input unit (PIU) suitable for use in the packet-redistribution mechanism of FIG. 7.

FIG. 8 illustrates an exemplary PIU 120-$i$ in greater detail. Each media source i accessible by the scaled server 90 is associated with a PIU 120-$i$ and the received packets are fed into an input 4 of PIU 120-$i$. A given packet applied to input 4 select one of two outputs $P'_i$ and $M'_i$ depending on the state of the packet. There are three states that a given incoming packet may have: the peak rate state P, the mean rate state M and the non-conformance state N. A packet is in the M state if there are less than $BM_i$ packets arriving within a cycle. A packet is in the P state if there are less than $BP_i$ and more than $BM_i$ packets arriving within a cycle. Otherwise, the packet is in the N state. P-state packets are routed to output $P'_i$ of the PIU 120-$i$, M-state packets are routed to output $M'_i$ of the PIU 120-$i$, and N-state packets are discarded or delayed.

The output selection in PIU 120-$i$ of FIG. 8 is implemented using a two-stage leaky bucket. A first leaky bucket 130 is used as a P-state arbitrator and is therefore controlled by a first token generator including a token counter 131 which holds $BP_i$ tokens within a cycle. If a packet arrives and there is a token in the token pool of counter 131, then the PIU 120-$i$ switches the packet to a second leaky bucket 136. If there is no token in the token pool of counter 131, the packet is discarded or kept in a temporary buffer depending upon the real-time requirement. The second leaky bucket 136 is used as a M-state arbitrator which switches the packet to either output $P'_i$ or $M'_i$ and is controlled by a second token generator including a token counter 137 which holds $BM_i$ tokens within a cycle. A selection circuit for the leaky buckets in PIU 120-$i$ is implemented by an operation of two bits, a token bit T and a head-of-line occupation (HOLO) bit H. The value T=1 indicates the presence of a token and the value H=1 indicates that a packet is waiting at the head of the line. For the first leaky bucket 130, a packet is switched to the second leaky bucket 136 or is dropped according to an output of AND gate 132 which receives bits T and H, as shown in TABLE 1 below. Another AND gate 134 is used to feed the token back to the token pool of counter 131 when there is no packet arrival. A similar method is used in conjunction with the second leaky bucket 136, second token generator counter 137 and AND gates 138, 140 to switch between the $M'_i$ and $P'_i$ outputs. A clock signal Clk is used to control the operation of the PIU 120-$i$. A reset signal is used to reset the token counters 131, 137 when a cycle has come to an end.

TABLE 1

| | | Token Feedback | | |
|---|---|---|---|---|
| H | T | H · T | H · T | Description |
| 0 | 0 | 0 | 0 | don't care |
| 0 | 1 | 0 | 1 | don't care |
| 1 | 0 | 0 | 0 | discard/feedback |
| 1 | 1 | 1 | 0 | discard/feedback |

Figure 9:
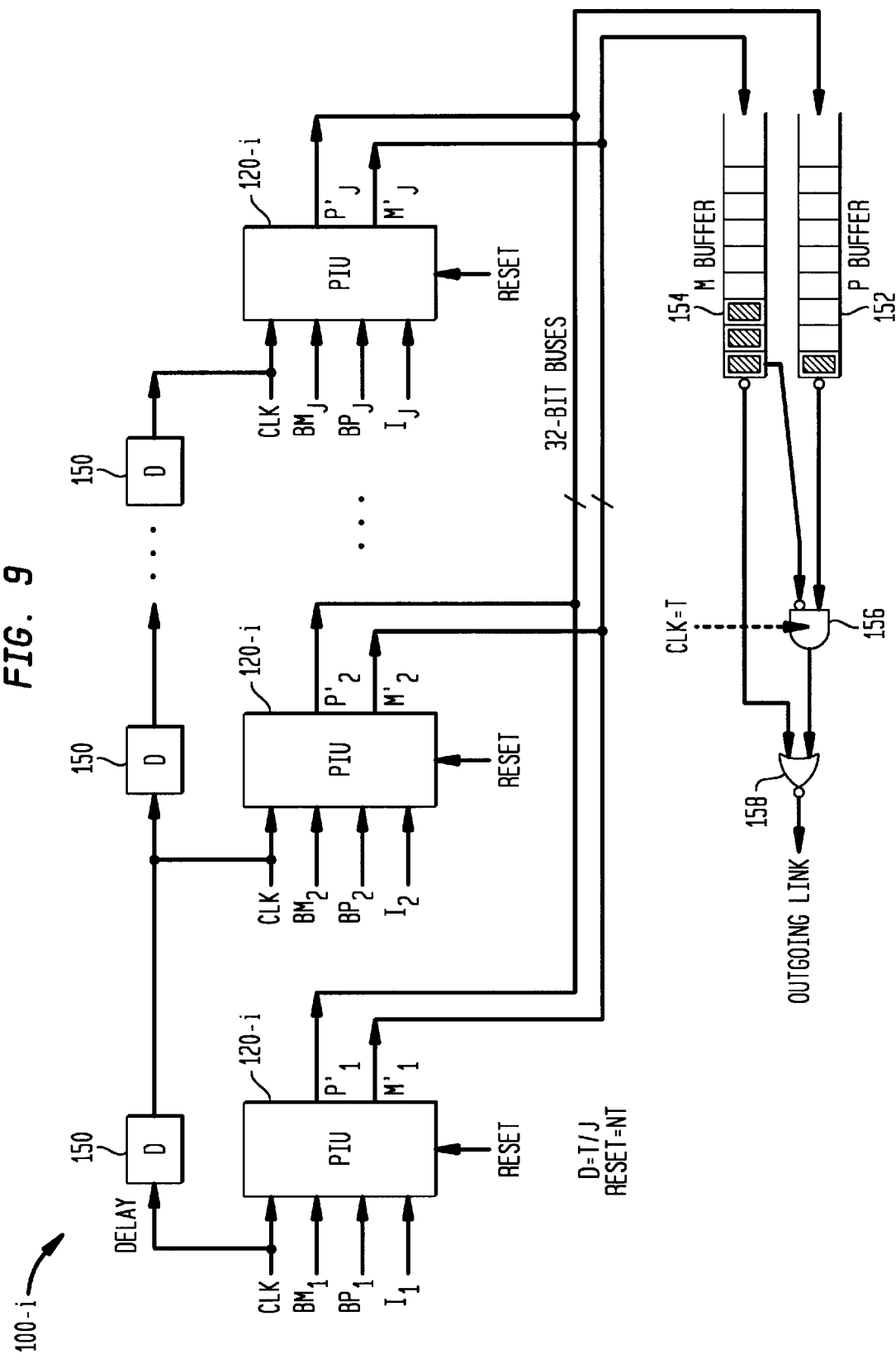
FIG. 9 is a schematic diagram of a stream multiplexer suitable for use in the scaled media server of FIG. 6.

FIG. 9 is a schematic diagram of an exemplary stream multiplexer 100-$i$ suitable for use in the scaled server 90 of FIG. 6. It will be assumed in this example that there are at most J video sources accessible by the scaled server 90. Since each PIU 120-$i$ is triggered by the Clk signal, delay circuits 150 are used such that several PIUs can be operated in a serial manner. A total of J PIUs are used in the stream multiplexer 100-$i$ and each PIU is associated with one of the delay circuits 150. The J delay circuits 150 are serially connected such that each PIU 120-$i$ may be operated serially. The delay circuits 150 may be configured to each provide a delay D on the order of T/J for a stream multiplexer 100-$i$ operating with a clock period T. The outputs of each PIU 120-$i$ are directed to either a P buffer 152 for P-state packets or an M buffer 154 for M-state packets. The two output buffers 152, 154 provide two distinct priority levels. Packets in the M buffer 154 have a higher priority for transmission over the outgoing link relative to the packets in the P buffer 152. This ensures that an average throughput can be guaranteed for each of the J video sources accessible by the scaled server 90. The peak throughput rates depend upon the admission control algorithm and can be computed using the number of multiplexed sources and the allowable maximum packet delay.

An exemplary implementation of the stream multiplexer 100-$i$ of FIG. 9 will now be described. The exemplary multiplexer 100-$i$ may utilize a packet size of 64 bytes and a 32-bit data bus width. The outgoing link speed may be 155 Mbps in accordance with the asynchronous transfer mode (ATM) OC-3 physical layer interface standard. The peak rate for each delivered stream in this example will be assumed to be 25.6 Mbps, although high-quality MPEG-2 video can be delivered using a peak rate of 12 Mbps. The required number of clock cycles for a given PIU to supply a packet to one of the output buffers 152, 154 will be on the order of 64×8/32=16. Since there are at most J streams to be delivered, the number of clock cycles required to supply all packets to the output buffers is given by 16J. The total time required to supply all packets to the output buffer is therefore given by 16JT, where T is the clock period. In the worst case scenario in which there is only one packet arrival during the time 16JT, the packet can be transmitted via the outgoing link within a time given by $1/(25.6 \times 10^6/(8 \times 64))$ or $2.0 \times 10^{-5}$ seconds. The total time 16JT therefore should be less than or equal to $2.0 \times 10^{-5}$ seconds. If the number of video sources J is selected as 126, the clock period T of the multiplexer 100-$i$ should be less than or equal to $1 \times 10^{-8}$ seconds or 10 ns. An exemplary system with 126 stream sources each having a peak rate of 25.6 Mbps could therefore be implemented with a clock rate on the order of 100 MHz.

A stream multiplexer 100-$i$ implemented in accordance with the present invention generally does not exhibit excessive hardware complexity. As shown in FIG. 8, each PIU 120-$i$ utilizes only a few AND gates and registers. An exemplary stream multiplexer implemented with a 155 Mbps ATM OC-3 outgoing link will require about 100 PIUs to process a 1.5 Mbps MPEG-1 video stream, and will therefore have a reasonable total gate count.

It should be understood that the foregoing description is merely illustrative of the invention. Numerous alternative embodiments within the scope of the appended claims will be apparent to those of ordinary skill in the art.

The claimed invention is:

1. A media server for use in retrieving stored data streams from a storage system, the media server comprising;

a plurality of scalable media server hosts, each including a plurality of stream pumping engines operative to retrieve requested data streams from corresponding storage devices of a storage system, and retrieved data stream outputs corresponding to each of the stream pumping engines; and a plurality of stream multiplexers having inputs cross-connected to at least one of the retrieved data stream outputs of each of the scalable media server hosts, and operative to deliver the retrieved data streams in accordance with quality of service restrictions, wherein each of the multiplexers includes first and second buffers for holding peak rate state and mean rate state packets, respectively, such that two distinct priority levels are provided for transmission of packets to subscribers.

2. The media server of claim 1 wherein a given one of the stream multiplexers further includes:

a plurality of packet distribution circuits; and a plurality of packet input units, wherein the packet distribution circuits distribute packets containing the retrieved data streams to packet input units, and each packet input unit is operative to accept a particular media stream on a packet-by-packet basis, to process the packets in accordance with the quality of service requirements of the particular stream, and to deliver the packets to a corresponding output buffer.

3. The media server of claim 2 wherein the packet distribution circuits check each packet received from the stream pumping units of the scalable media server hosts and distribute the packets to the correct packet input units such that each packet input unit can independently process a different retrieved data stream.

4. The media server of claim 2 wherein a given one of the packet input units further includes:

an input for receiving the packets of a particular data stream;

a mean rate state output; and a peak rate state output, wherein the packet input unit determines whether a given packet applied to the input is in a peak rate state, a mean rate state or a non-conformance state, and routes a given packet in the mean rate state to the mean rate output, routes a given packet in the peak rate state to the peak rate output, and allows a packet in the non-conformance state to be delayed.

5. The media server of claim 4 wherein the packet input unit utilizes a two-stage leaky bucket mechanism to determine the state of the given packet.

6. The media server of claim 2 wherein the server accesses at most J video sources and includes a total of J packet input units in each of the stream multiplexers.

7. A media server for use in retrieving stored data streams from a storage system, the media server comprising:

a plurality of salable media server host, each including a plurality of stream pumping engines operative to retrieved data stream outputs corresponding storage devices of a storage system, and retrieved data stream outputs corresponding to each of the stream pumping engines; and a plurality of stream multiplexers having inputs cross-connected to at least one of the retrieved data stream outputs of each of the scalable media server hosts, and operative to deliver the retrieved data streams in accordance with quality of service restrictions, wherein a given one of the stream multiplexers further includes:

a plurality of packet distribution circuits; and a plurality of J packet input units, wherein the packet distribution circuits distribute packets containing the retrieved data streams to packet input units, and each packet input unit is operative to accept a particular media stream on a packet-by-packet basis, to process the packets in accordance with the quality of service requirements of the particular stream, and to deliver the packets to a corresponding outputs buffer, wherein the J packet input units of a given stream multiplexer are serially interconnected with J delay circuits such that each of the J packer input units operates serially.

8. The media server of claim 7, wherein each of the multiplexers includes first and second buffers for holding peak rate state and mean rate state packets, respectively, such that two distinct priority levels are provided for transmission of packets to subscribers.

* * * * *